United States Patent Office 3,711,405
Patented Jan. 16, 1973

3,711,405
LOW FLUID LOSS WELL TREATING
COMPOSITION AND METHOD
David S. Pye, Brea, Paul W. Fischer, Whittier, and Julius P. Gallus, Anaheim, Calif., assignors to Union Oil Company of California, Los Angeles, Calif.
No Drawing. Filed Nov. 19, 1969, Ser. No. 878,254
Int. Cl. C10m 3/08; E21b 43/25
U.S. Cl. 252—8.55 R
8 Claims

ABSTRACT OF THE DISCLOSURE

A low loss well treating composition comprising a dispersion of solid wax or wax-polymer particles in an aqueous liquid containing a hydrophilic agent consisting of water-soluble surface active agents or water-dispersible surface active agents, and a lipophilic agent consisting of oil-soluble surface active agents, oil-dispersible surface active agents and oleaginous liquids; and a process employing this composition in well drilling and treating.

---

This invention relates to the treating of subterranean formations penetrated by a well, and more particularly to methods for treating permeable subterranean formations employing a special low loss fluid. In other aspects, the invention relates to improved low loss fluid compositions useful in the treatment of oil and gas wells. The method and compositions of this invention have particular application in hydraulic fracturing of subterranean formations, in well treating processes wherein a treating fluid is injected thoough a well and into a formation penetrated by the well, and to the completion of wells drilled into oil-bearing permeable formations.

In various well treating operations, such as for example, in the drilling of wells into subterranean earth formations, in the completion of wells in permeable hydrocarbon producing zones, and in stimulating the recovery of oil and gas from these producing zones, it is often advantageous to inject a fluid into the well in such a manner that the fluid is in contact with the earth formation penetrated by the well. Drilling muds, completion fluids, fracturing fluids, acids, and other well treating liquids injected into the well bore preferentially flow into zones of higher permeability, called thief zones, not only resulting in loss and waste of the fluid, but also preventing the injected fluid from entering into zones of lower permeability in substantial quantities, or at least causing poor distribution between zones of different permeability. The loss of treating fluid to the formation is increased at the elevated injection pressures employed in many well treating operations.

Fluid loss to permeable zones is particularly troublesome in hydraulic fracturing. Conventionally, fracture planes or cleavages extending from the well bore into the formation are formed by subjecting the formation to elevated fluid pressure. Hydraulic pressure is developed by pumping a fluid down the well and into contact with the underground formation to be fractured. Since most formations are to some degree permeable, a portion of the injected fluid will pass from the well into the formation. The fracturing fluid must be injected into the well at a volume flow rate exceeding the rate of fluid loss into the formation in order that the pressure exerted upon the formation by the fracturing fluid will be increased as the fluid is injected. Fluid injection must be continued in this manner until the pressure of the fluid at the fracturing zone is increased sufficiently to overcome the tensile strength of the formation and the weight of the overburden, thereby effecting an initial separation of the earth formation at a point of minimum strength. Upon forming the initial fracture, fluid injection is continued to extend the fracture into the formation. Since the formation face contacted by the fracturing fluid is increased as the newly formed fractures are extended into the formation, fluid loss to the formation also increases, particularly where additional permeable zones are opened by the fracture. Although higher fluid injection rates are required to further extend the fracture planes into the formation, fluid availability is decreased because of increased loss to the formation.

Where one or more highly permeable zones are in communication with the well and receiving the fracturing fluid, it is sometimes impractical to inject fluid at sufficiently high volume flow rates to effect the necessary pressure buildup because of the large loss of fluid to these permeable zones. In other cases, fracturing can only be effected by the injection of large quantities of fracturing fluid requiring a number of injection pumps. Such fracture jobs are expensive, not only because of the additional equipment required, but also because of the high energy consumption in the useless injection of fluid into the formation. More importantly, since the areal extent of the fracture plane is generally increased by higher volume injection rates into the actual fracture, loss of fluid to permeable zones of the formation results in less fracturing fluid being available to extend the fracture. Thus, fluid loss is not only costly, but it can result in inferior fracturing and ultimately in decreased oil recovery.

Various techniques have been proposed to reduce the loss of well treating fluids to the formation. For example, the penetration of treating fluid into the formation can be decreased by adding thickening or gelling agents to alter the viscosity characteristic of the fluid. Napalm type gelling agents are conventionally employed with hydrocarbon base fluids. Among the various substances which have been proposed as bodying agents for aqueous treating fluids are gums, such as guar, traganth, talha, damas, karaya, and batu; colloidal substances such as starch, dextrin, Irish moss and silica flour; and various water-soluble polymers such as polyacrylates and polyacrylamides. While bodied fluids are rendered less susceptible to fluid loss, higher injection pressures are generally required because of increased pressure drop through flow conduits. Particularly in the case of hydraulic fracturing, injection pressures are often limited by the pressure rating of well head equipment, casings and tubing strings. The increased pressure drop results in reduced hydraulic pressure in the fracturing zone. Further, on completion of the treating job, the thickened fluid must be removed from oil producing zones to restore permeability. Although gel breaking fluids can be injected for this purpose, destruction of the gel is only partially complete resulting in some permanent loss of permeability.

Alternatively, it has been proposed to add to the treating fluid substances which do not have a pronounced effect on the properties of the fluid, but act instead to form a mat or deposit on the formation face, or which enter into the small flow channels or interstices of the formation rendering the formation more or less impermeable to the treating fluid. Suggested materials include fibrous or finely divided, substantially oil and water insoluble solid material capable of suspension in the treating fluid, such as shredded or granular particles of asbestos, mica, plastic, cotton fibers, cellophane and chopped rope. Other materials employed as fluid loss additives include finely divided, insoluble minerals and salts. A well known commercial fluid loss additive employs a mixture of finely divided, relatively insoluble sulfonate salt and alkaline earth metal carbonate, e.g., mixtures of calcium sulfonate and calcium carbonate. However, even though the foregoing materials are more or less effective in reducing the loss of fluid to the formation, they commonly have the undesirable effect of permanently reducing the formation permeability, thus adversely affecting the ultimate recovery of oil from the producing zone. Similarly, less permanent fluid loss additives, such as particles of ice and asphalt emulsions, have not been generally satisfactory.

An improved method for treating permeable subterranean formations has been disclosed wherein small oil-soluble, water-insoluble wax or wax-polymer particles are dispersed in an aqueous treating fluid. The dispersed solids are deposited in the formation during the well treating process so as to render the formation less permeable to the treating fluid. The particulate matter is specifically selected to be slowly soluble in the reservoir hydrocarbons. Thus, the matter deposited in the oil-producing zones during the treating process is dissolved or at least solubilized to the extent that they are removed from these zones by the formation hydrocarbons on return of the well to production with substantially no permanent loss of formation permeability.

The discrete wax and wax-polymer particles are highly successful as diverting agents in many well treating applications, and to a great extent effect a reduction in the loss of treating-fluid to the formation. However, in certain fracturing, well drilling, completion and well treating operations, it is desirable to reduce the loss of fluid to the formation to a value heretofore unobtainable with an aqueous dispersion of wax or wax-polymer particles, yet without incorporating fluid loss control agents that cause permanent permeability reduction, or which otherwise damage the formation.

Accordingly, it is an object of the present invention to provide an improved well treating process for temporarily plugging a permeable subterranean formation to prevent or retard the flow of fluids therethrough. Another object is to provide a well treating process employing a low loss fluid composition which does not cause permanent loss of formation permeability. Another object is to provide an improved method for hydraulically fracturing permeable formations. Still another object is to provide a process for fracturing permeable formation wherein the loss of fracturing fluid to the formation is reduced. A further object is to provide a well treating composition having the property of reduced fluid loss to the formation. A still further object is to improve the fluid loss properties of aqueous dispersions of solid wax and wax-polymer particles. Other objects and advantages of the invention will be apparent to those skilled in the art from the description thereof which follows.

The foregoing objects and their attendant advantages can be realized with a low loss fluid comprising a dispersion of oil-soluble, water-insoluble solid wax or wax-polymer particles in an aqueous liquid containing a hydrophilic agent consisting of a water-soluble surface active agent or a water-dispersible surface active agent and a lipophilic agent consisting of an oil-soluble surface active agent, an oil-dispersible surface active agent, or an oleaginous liquid. These agents, in combination with the solid wax or wax-polymer particles, cooperate to reduce the fluid loss of the aqueous dispersion to a value below that obtainable with the solid wax or wax-polymer particles alone, or with the particles dispersed in an aqueous liquid containing a single surface active agent, yet they do not permanently affect the permeability of the oil-bearing strata of the formation.

The oil-soluble, water-insoluble solid wax or wax-polymer particles are solid particles of an oil-soluble petroleum wax, or homogeneous solid solutions of petroleum wax and a polymer selected to exhibit a controlled, slow solubility in the reservoir oil, and are insoluble in water, or aqueous acid, caustic or brine solutions. Solid particulate matter exhibiting these properties can be dispersed in an aqueous carrier liquid without being dissolved therein; thus, the solid agent retains its particulate form while dispersed in the aqueous liquid, and furthermore, the properties of the aqueous medium are not altered by dissolution of the solid material.

On injection into the well, the dispersion tends to penetrate into the formation to a greater or lesser extent along all of the formation face exposed to the fluid. The quantity of fluid entering into the formation and the depth of penetration is dependent in part on the porosity and permeability of the structure. As the dispersion passes into the formation, some of the solids may be filtered from the carrier liquid so as to form a mat of solid particles on the face of the formation tending to prevent further penetration of fluid into the formation. However, in most zones having a more open structure, dispersed solids are carried into the formation with the carrier liquid to be deposited in the pores, and to therein form interstitial plugs preventing or retarding the flow of fluid into the formation. Since the dispersion has greater tendency to enter into the more permeable zones, these zones will be preferentially plugged so as to result in a partially plugged formation of more or less uniform permeability. The flow of fluid into the formation rapidly decreases as the plug is established, the total quantity of fluid lost to the formation being controlled, in part, by the quantity of additive material employed. Thus, the loss of carrier fluid to the formation at the face of the well and along fracture faces extending into the formation is minimized by the combination of a mat of solid particles formed on the formation face and by intersticial plugging within the formation.

It is desired that the oil solubility of the wax or wax-polymer particles be such that upon their placement in the formation, or upon the face of the formation, they will remain as solids for a time period sufficient to perform a particular well treating operation, but will be slowly dissolved in the oil, or at least solubilized to the extent that they are removed from the oil producing zones on return of the well to production. Thus, the wax or wax-polymer particles function as plugging agents effective in reducing the permeability of the formation for a limited time period, such as from a few hours to several days, depending upon the solubility or dispersibility of the particles in the reservoir oil. Further, since the particles are substantially insoluble in connate water and brine, plugs established in water producing zones, in which oil is not present to function as a solvent, will be largely permanent resulting in selective water shutoff.

The solid oil-soluble, water-insoluble plugging agents that can be used in the practice of this invention can be solid particles of petroleum wax, such as crystalline and microcrystalline paraffin waxes melting between about 130° F. and about 165° F. The wax component is selected for its solubility in the reservoir oil, and preferably has a melting point above the injection temperature, and more preferably above the reservoir temperature, although in some treating applications, sufficient cooling is obtained by the injection of the aqueous fluid to permit the use of solid particles comprised of waxes melting somewhat below the reservoir temperature.

A superior fluid loss additive for dispersion in an aqueous carrier liquid can be formed from particulated homogeneous solid solutions of wax and (1) an addition polymer of an olefin having between two and four carbon atoms, (2) copolymers of an olefin having between two and four carbon atoms and an alkyl acrylate containing not more than four carbon atoms in the alkyl group, (3) copolymers of an olefin having between two and four carbon atoms and an ester formed by the reaction of butenic acid and an alcohol having no more than four carbon atoms, and (4) copolymers of olefins having between two and four carbon atoms and an ester formed by the reaction of acetic acid and an unsaturated alcohol having no more than four carbon atoms.

Preferred polymer component materials include polyethylene, polypropylene, polybutylene, copolymers of ethylene and vinyl acetate, copolymers of ethylene and methyl methacrylate, and copolymers of ethylene and ethyl acrylate. A single polymer component selected from the above classes of polymeric components may be employed, or two or more such materials can be combined. Each of the aforesaid polymer components will impart somewhat different properties of strength, ductility, solubility, melting point, density, and dispersibility to the final solid composition. Desired properties not obtainable with a single polymeric material can often be achieved with blends of two or more of these polymers, or by the addition of other polymers and resins to the composition.

A number of oil-soluble, water-insoluble solid particles which can be employed herein in accordance with this invention are fully disclosed in U.S. Pats. Nos. 3,302,719 and 3,316,965.

The solid wax and wax-polymer particles used in the practice of this invention vary widely in size and shape. Typically, these particles can be spheroids, cubes, granules, buttons, flat disks, or mixtures thereof, having mean diameters in the range of from about ½-inch to about 1 micron and less. More particularly, the particles can be cubes, buttons or disks having a size in the range of from about ¼-inch to about ½-inch, spheroids or granules in the size range of from about 4 to 200 mesh U.S. Sieve, or particles having a mean diameter between about 1 to about 50 microns.

The particular solid particle content required usually depends upon the characteristics of the formation and the degree of fluid shutoff desired, with an additive content of up to about 60 weight percent, and particularly within the range of about 0.1 to about 60 weight percent being generally satisfactory in most operations. In hydraulic fracturing, where a fairly high degree of fluid shutoff is desirable, an additive content above about 0.5 weight percent, and preferably within the range of about 0.5 to 40 weight percent is preferred. In other treating applications, such as for example in acidizing, where only partial plugging to effect more uniform distribution of the injected fluid throughout zones of varying permeability is desired, a lower additive content is preferred, and particularly an additive content of less than 10 weight percent.

The fluid loss properties of aqueous fluids containing the above-described oil-soluble, water-insoluble wax or wax-polymer particles are substantially enhanced by incorporating therein a preferentially hydrophylic agent and a preferentially lipophilic agent which together synergistically cooperate with the dispersed solid particles to effectively reduce fluid loss.

The hydrophilic agents which can be employed in the practice of this invention are surface active agents of the nonionic, anionic or cationic types that are either soluble or dispersible in water, and which do not gel the water at concentrations less than about 25 weight percent. The water-soluble agents form opalescent or clear solutions when admixed with water at the concentration of surfactant to be employed, and the water-dispersible agents form uniform, stable dispersions of the surfactant in water at the desired surfactant concentration. By uniform, stable dispersion it is meant that the surfactant is dispersed throughout the liquid in the form of macromolecular particles. Such dispersions usually exhibit a cloudy appearance, as contrasted with the clear solutions formed by the soluble surfactants, but these dispersions are stable in that they do not separate into visibly distinct phases on standing.

The lipophilic agents are oleaginous, liquids, or surface active agents of the nonionic, anionic or cationic types that are either soluble or dispersible in oil. The oleaginous liquids which are useful in the practice of this invention are substances exhibiting an oily property and that are normally liquid at ambient temperature, and include various alkanes, such as nonane, decane, unadecane, dodecane, etc.; fatty acids such as caprylic acid, capric acid, lauric acid, myristic acid, palmitic acid, stearic acid, etc.; vegetable oils, such as linseed oil, soybean oil, castor oil, olive oil, peanut oil, etc.; alcohols, such as heptanol, octanol, nonanol, decanol, etc.; and cyclic hydrocarbons, such as naphthenes and aromatics. Particularly preferred oleaginous liquids are liquid hydrocarbon mixtures, such as crude petroleum and petroleum distillates, including gasoline, kerosene, stove oil, diesel and gas oil.

The oil-soluble or oil-dispersible surface active agents that are employed in the practice of this invention are surface active agents of the nonionic, anionic or cationic types that are either soluble or dispersible in oil, and which do not gel the oil solution at surfactant concentrations of less than about 25 weight percent. The oil-soluble surfactants form opalescent or clear solutions when admixed with oil at the concentration to be employed, and the oil-dispersible agents form uniform stable dispersions of the surfactant in oil at the desired surfactant concentration.

The solubility and dispersibility of surface active materials in both water and oil can be determined from published data that are available for most of the commercial surfactants. However, when dispersion data are not available, the dispersibility of the surfactant in water and in oil can be determined by a relatively simple test, which can be conducted at a desired surfactant concentration or at a standard concentration of 1.0 weight percent surfactant. To conduct this test, a quantity of the surface active agent sufficient to provide the desired concentration is admixed with 100 ml. of water and 100 ml. of Stoddard solvent, a straight run petroleum distillate having a boiling range of 300 to 400° F., in two milliliter graduated cylinders. These ingredients are thoroughly admixed and allowed to remain quiescent for 60 minutes. At the end of the quiescent period, the mixtures are visually compared. Surface active agents that are soluble in the respective solvent exhibit a clear, bright appearance in solution. The water or oil dispersible agents exhibit a uniform, cloudy or turbid appearance in the respective solvent, that does not change appreciably on standing. Those agents that separate into separate visible phases in oil are not considered oil-dispersible.

While it is apparent that many surface active agents are soluble or dispersible in both water and oil, it is preferred that the surface active materials employed as the hydrophilic agent exhibit a preferential affinity for water, and that the surface active materials employed as the lypophilic agent exhibit a preferential affinity for oil.

A number of commercial surface active agents exhibit properties that render them suitable for use as the hydrophilic agent in the practice of the invention. Exemplary commercial surfactants useful as the hydrophilic agents of this invention are listed in Table 1.

TABLE 1.—EXEMPLARY COMMERCIAL HYDROPHILIC SURFACTANTS

| Company | Trademark | Chemical Composition |
|---|---|---|
| Rohm & Haas | Triton X-165 | Octyl phenoxypolyethoxy ethanol. |
| Do | Triton X-305 | Do. |
| Do | Triton X-405 | Do. |
| Retzloff Chem Co | Retzonal NP | Alkyl phenoxypolyoxyethylene ethanol. |
| Do | Retzonal SN | Ethylene oxide adducts of a straight chain fatty alcohol. |
| Do | Retzonal TD | Polyoxyethylene ether. |
| Armour Ind. Chem | Ethofat 0/15 | Polyethoxylated fatty acid. |
| Do | Ethofat c/25 | Do. |
| Do | Ethofat 242/25 | Do. |
| Do | Ethomeen c/15 | Polyethoxylated amine. |
| Do | Ethomeen c/20 | Do. |
| Do | Ethomeen c/25 | Do. |
| Do | Ethomeen s/25 | Do. |
| Do | Ethomeen 18/60 | Do. |

TABLE 2—Continued

| Company | Trademark | Chemical Composition |
|---|---|---|
| Onyx Chem. Corp | Onyxol WW | Mixed fatty acid diethanol amine condensate. |
| Stepan Chem. Co | Ninol 1281 | Fatty acid alkanolamide. |
| E. I. duPont deNemours | Dupanol QC | Sodium lauryl sulfate. |
| Feneral Aniline & Film | Gafac PE-510 | Free acid of complex organic phosphate ester. |
| Do | Gafac RE-610 | Do. |
| Do | Gafac LO-529 | Sodium salt of complex organic phosphtae ester. |
| Atlas Chem. Indus | Tween 20 | Polyoxyethylene sorbitan monolaurate. |
| Do | Tween 40 | Polyoxyethylene sorbitan monopalmitate. |
| Do | Tween 60 | Polyoxyethylene sorbitan monostearate. |
| Do | Tween 80 | Polyoxyethylene sorbitan monooleate. |
| Do | Atlas G-2076 | Polyoxyethylene monopalmitate. |
| Do | Atlas G-2127 | Polyoxyethylene monolaurate. |
| Do | Myrj 53 | Polyoxyethylene monostearate. |
| Do | Renex 20 | Polyoxyethylene esters of mixed fatty and resin acids. |
| General Aniline & Film | Igepon TE-42 | Sodium N-methyl-N-tallow acid taurate. |
| Do | Igepon TN-74 | Sodium N-methyl-N-palmitoyl taurate. |
| Do | Igepal CA-630 | Octylphenoxypolyethoxy ethanol. |
| Do | Emulphor EL-719 | Polyoxyethylated vegetable oil. |
| Do | Emulphor ON-870. | Polyoxyethylated fatty alcohol. |
| Wyandotte Chemicals | Pluronic L-62 | Polyoxyethylene polyoxypropylene. |

Particularly preferred hydrophilic agents for use with the aqueous dispersions of this invention include (1) a condensation product of an alkylphenol having between about 14 and 20 carbon atoms and about 10 to 70 moles of ethylene oxide per mole of alkylphenol, exemplary of which are surfactants marketed by the Rohm and Haas Company under the trademarks Triton X-165, Triton X-305 and Triton X-405; (2) a condensation product of a fatty acid having between about 12 and 20 carbon atoms and about 12 to 50 moles of ethylene oxide per mole of fatty acid, exemplary of which are surfactants marketed by the Armour Industrial Chemicals Company under the trademarks Ethofat 0/15 and Ethofat C/25; (3) a condensation product of a primary fatty amine having between about 12 and 20 carbon atoms and about 5 to 50 moles of ethylene oxide per mole of fatty amine, exemplary of which are surfactants marketed by the Armour Industrial Chemical Company under the trademarks Ethomeen C/20, and Ethomeen 18/60; (4) a fatty acid ester of polyoxyethylene glycol having a polyoxyethylene chain containing between about 15 and 50 mole equivalents of ethylene oxide, exemplary of which are surfactants marketed by the Atlas Chemical Industries under the trademarks Tween 20, Tween 40, Tween 60 and Tween 80; (5) an alkali metal salt of N-methyl-N-fatty acid taurate, exemplary of which is a surfactant marketed by General Aniline and Film Company under the trademark Igepon TE-42; (6) a free acid or alkali metal salt of a water-soluble complex of an organic phosphate ester having between about 20 and 80 carbon atoms, exemplary of which are surfactants marketed by General Aniline and Film Company under the trademarks Gafac PE-510, Gafac RE-610 and Gafac LO-529; (7) a condensation product of ethylene oxide and propylene oxide, having a molecular weight between about 1000 and 1800, exemplary of which is a surfactant marketed by the Wyandotte Chemical Company under the trademark Pluronic L-62; and (8) an alkali metal salt of a sulfonated alcohol having between about 6 and 18 carbon atoms, exemplary of which is a surfactant marketed by E. I. duPont deNemours under the trademark Dupanol QC.

Exemplary oil-soluble or oil-dispersible surface active agents that can be employed as the lipophilic agent in the practice of this invention include the commercial surfactants listed in Table 2.

TABLE 2.—EXEMPLARY COMMERCIAL LIPOPHILIC SURFACTANTS

| Company | Trademark | Chemical Composition |
|---|---|---|
| Atlas Chem. Indus | Span 20 | Sorbitan monolaurate. |
| Do | Span 40 | Sorbitan monopalmitate. |
| Do | Span 80 | Sorbitan monooleate. |
| Do | Span 65 | Sorbitan tristearate. |
| Do | Span 85 | Sorbitan trioleate. |
| Do | Atlas G-922 | Propylene glycol monostearate. |
| Do | Atlas G-2124 | Diethylene glycol monolaurate. |
| Do | Atmul 500 | Mono and diglycerides from glycerolysis of edible fats. |
| Do | Atmul 67 | Glycerol monostearate. |
| Do | Atlas G-2800 | Polyoxypropylene mannitol dioleate. |
| Rohm & Haas | Triton X-15 | Octylphenoxypolyethoxy ethanol. |
| Do | Triton X-35 | Do. |
| Do | Triton X-45 | Do. |
| General Aniline & Film | Gafac MC-470 | Partial sodium salt of a complex organic phosphate ester. |
| Armour Ind. Chem | Ethomeen C/12 | Polyethoxylated amines. |
| Do | Ethomeen S/12 | Do. |
| Do | Ethomeen T/12 | Do. |
| Do | Ethomeen 18/15 | Do. |
| Glyco Chem. Ind | Aldo ML | Glycerol monolaurate. |
| Do | Aldo MO | Glycerol monooleate. |
| Do | Aldo MS | Glycerol monostearate. |

Particularly preferred oil-soluble and oil-dispersible surface active agents include (1) a fatty acid ester of glycol, glycerol or sorbitol, exemplary of which are surfactants marketed by Atlas Chemical Industries under the trademarks Span 20, Span 40, Span 80, Span 65 and Span 85; (2) a condensation product of an alkylphenol having between about 12 and 20 carbon atoms and about 1 to 10 moles of ethylene oxide per mole of alkylphenol, exemplary of which are surfactants marketed by the Rohm and Haas Company under the trademarks Triton X-15 and Triton X-35; and (3) a condensation product of a primary fatty amine having between about 12 and 20 carbon atoms and about 1 to 5 moles of ethylene oxide per mole of fatty amine, exemplary of which are surfactants marketed by the Armour Industrial Chemical Company under the trademarks Ethomeen C/12, Ethomeen S/12, Ethomeen T/12 and Ethomeen 18/15.

While the combination of the aforementioned hydrophilic and lipophilic agents in conjunction with aqueous dispersions of wax or wax-polymer particles cooperate to effectively reduce fluid loss below that obtainable with an aqueous dispersion of solid wax or wax-polymer particles alone or in admixture with a single surfactant, it is recognized that selected combinations of the hydrophilic and lipophilic agents may exhibit superior fluid loss properties as compared with various other combinations. Accordingly, a relatively simple test can be made to determine the effectiveness of preferred combinations of hydrophilic and lipophilic agents. In this test a measured amount of the hydrophiilc agent, a measured amount of the lipophilic agent, 5 grams of solid wax or wax-polymer particles, and 500 milliliters of water at ambient temperature are admixed and continuously agitated. One face of a kerosene-saturated cylindrical Berea sandstone test core having a length and a diameter of 1-inch is contacted with the dispersion at a pressure of 500 p.s.i.g., with the other face of the test core being maintained at atmospheric pressure. Fluid exiting the core is collected and the cumulative volume of combined fluid effluent collected over a five-minute period is measured. The relative fluid loss reduction is determined by comparison of the measured fluid loss with the fluid loss obtained by an agent free, aqueous dispersion of wax or wax-polymer particles. Those combinations which reduce the fluid loss of the agent free aqueous dispersion by at least 60 percent are preferred, and those combinations which reduce the fluid loss by 80 percent or more are particularly preferred.

The concentration of the hydrophilic agent and of the lipophilic agent employed in the aqueous wax or wax-polymer dispersions of this invention can vary over a wide range depending upon the dispersibility of the agents in the aqueous fluid and the amount of solid wax or wax-polymer particles dispersed. Generally, however, the concentrations of the hydrophilic and lipophilic agents each range from about 0.05 to 25 weight percent of the agent based upon the weight of wax particles, i.e., from about 0.0005 to 0.25 parts by weight of agent per unit weight of solid particles. A more preferred concentration range for each agent is between about 0.1 and 15 weight percent of the additive agent based upon the weight of the solid wax or wax-polymer particles. It is also preferred that the concentration of both agents increase with decreasing particle size, i.e., as the surface area of the solid particles increases, it is preferred that the concentration of each additive agent be increased proportionally. Moreover, it is further preferred that the concentration of hydrophilic agent in the aqueous dispersion be greater than the concentration of lipophilic agent, and preferably from about 1 to 4 parts of hydrophilic agent per part of lipophilic agent.

The low loss fluid can be prepared by admixing the particulate additive, the hydrophilic agent, the lipophilic agent and the aqueous carrier liquid at the well site, or alternatively, a concentrated slurry of the solid particles and the agents can be prepared and later mixed into the carrier liquid. In cases wherein it is difficult to disperse the combined hydrophilic and lipophilic agents in the aqueous liquid, it may be necessary to first heat the aqueous carrier liquid to disperse the agents prior to the addition of the solid particles.

The low loss fluid composition of this invention can be effectively employed as a drilling fluid in well drilling, and particularly as a completion fluid in the drilling of oil and gas wells. In this application, the fluid is circulated from the surface to the drilling zone in a subterranean formation during the drilling operation, and at least a portion of the fluid is returned to the surface. The compositions of this invention also have utility as fracturing fluids in the hydraulic fracturing of oil wells, the fracturing fluids being injected under elevated pressure to cause fracturing of the subsurface formation, and in chemical treating, acidizing, and other well treating operations wherein it is desired to control fluid loss to permeable underground structures.

The invention is further illustrated by the following examples which are illustrative of specific modes of practicing the invention and are not intended as limiting the scope of the invention as defined by the appended claims.

EXAMPLES 1–24

The effectiveness of the combination of various hydrophilic agents and lipophilic agents in improving the fluid loss properties of aqueous dispersions of solid wax-polymer particles is demonstrated by a series of fluid loss tests. In each test, a standard test core is contacted with an aqueous dispersion containing the same proportion of solid wax-polymer particles at elevated pressures, and the volume of fluid passing through the core is measured. A different combination of a hydrophilic agent and a lipophilic agent is employed in each of the tests, and the volume of the fluid passing through the core in a fixed time period is indicative of the fluid loss properties of the various dispersions. In order to illustrate the synergism of the combined agents in improving the fluid loss properties of an aqueous dispersion of solid wax-polymer particles, separate fluid loss tests are conducted for wax-polymer dispersions containing each of the additive agents individually.

The aqueous dispersions containing the combination of agents are prepared by admixing 5 grams of wax-polymer particles having a mean diameter less than 50 microns with 500 milliliters of water, 0.25 gram of hydrophilic agent and 0.08 gram of lipophilic agent. The aqueous particle dispersions containing only one of the agents are prepared by admixing 5 grams of the wax-polymer particles with 500 milliliters of water and 0.33 gram of the particular agent. The particles employed in this example are homogeneous solid solutions of 90 weight percent paraffin wax, having a melting point of about 165° F., and 10 weight percent ethylene-ethyl acrylate copolymer marketed by the Dow Chemical Company under the trademark Zetafax 1075. It is sometimes necessary to first disperse the agent or agents in the water prior to the addition of the wax-polymer particles, and may require a mild heating of the initial aqueous solution. The aqueous dispersions are stirred at high speed for five minutes prior to being transferred to the test core apparatus, and are stirred at a low speed throughout the fluid loss tests.

The test cores are cylinders of Berea sandstone 1-inch in diameter by 1-inch in length and are initially prepared by saturating them with water, and then displacing the water with kerosene. The cores are then mounted in standard brass core holders so that one face of the cylinder is contacted with the aqueous dispersion under 500 p.s.i.g. pressure while the other face of the cylinder is maintained at atmospheric pressure. Thus, each test core is subjected to a 500 p.s.i. differential pressure tending to drive the aqueous dispersion through the core. The aqueous fluid flowing through the core displaces the kerosene, and the combined fluid is collected. The tests are conducted at room temperature, i.e., at a temperature of about 78° F.

The cumulative volume of combined fluid effluent collected over a five-minute period for each of the fluid loss tests is measured and reported in Table 3.

TABLE 3.—FLUID LOSS THROUGH PERMEABLE CORES

| | Hydrophilic agent | | | Lipophilic agent | | | Fluid loss (ml./5 min.) | | |
|---|---|---|---|---|---|---|---|---|---|
| Example | Company | Trademark | Chemical | Company | Trademark | Chemical | HAO [1] | LAO [2] | Combination |
| 1 | Atlas Chem. Ind. | Tween 20 | Polyoxyethylene sorbitan monolaurate. | Atlas Chem. Ind. | Span 20 | Sorbitan monolaurate. | 188 | 72 | 44 |
| 2 | Rohm & Haas | Triton X-165. | Octylphenoxy polyoxyethylene ethanol. | do | do | do | 85 | 72 | 28 |
| 3 | Armour Ind. Chem. | Ethofat C/25. | Polyethoxylated fatty acids. | do | do | do | 76 | 72 | 31 |
| 4 | General Aniline & Film. | Igepon TE-42. | Sodium N-methyl-N-tallow acid taurate. | do | do | do | 180 | 72 | 58 |
| 5 | do | Gafac RE-610. | Free acid of complex organic phosphate ester. | Rohm & Haas. | Triton X-35. | Octylphenoxy polyoxyethylene ethanol. | 99 | 175 | 71 |
| 6 | Rohm & Haas | Triton X-165. | Octylphenoxy polyoxyethylene ethanol. | do | do | do | 85 | 175 | 36 |
| 7 | Armour Ind. Chem. | Ethomeen C/20. | Polyethoxylated fatty amine. | do | do | do | 163 | 175 | 132 |
| 8 | Atlas Chem. Ind. | Tween 20 | Polyoxyethylene sorbitan monolaurate. | do | do | do | 188 | 175 | 45 |
| 9 | Armour Ind. Chem. | Ethofat C/25. | Polyethoxylated fatty acid. | Armour Ind. Chem. | Ethomeen C/12. | Polyethoxylated amine. | 76 | 49 | 37 |
| 10 | Wyandotte Chem. Corp. | Pluronic L-62. | Polyoxyethylene polyoxypropylene. | do | do | do | 100 | 49 | 94 |

TABLE 3.—FLUID LOSS THROUGH PERMEABLE CORES—Continued

| | Hydrophilic agent | | | Lipophilic agent | | | Fluid loss (ml./5 min.) | | |
|---|---|---|---|---|---|---|---|---|---|
| Example | Company | Trademark | Chemical | Company | Trademark | Chemical | HAO [1] | LAO [2] | Combination |
| 11 | General Aniline & Film. | Igepon TE-42. | Sodium N-methyl-N-tallow acid taurate. | do | do | do | 180 | 49 | 32 |
| 12 | E. I. duPont deNemours. | Dupanol QC. | Sodium lauryl sulfate | do | do | do | 87 | 49 | 45 |
| 13 | do | do | do | Atlas Chem. Ind. | Span 80 | Sorbitan monooleate. | 87 | 41 | 32 |
| 14 | Armour Ind. Chem. | Ethomeen C/20. | Polyethoxylated fatty amine. | do | do | do | 163 | 41 | 28 |
| 15 | General Aniline & Film. | Igepon TE-42. | Sodium-N-methyl-N-tallow acid taurate. | do | do | do | 180 | 41 | 19 |
| 16 | do | Gafac RE-610. | Free acid of complex organic phosphate ester. | do | do | do | 99 | 41 | 29 |
| 17 | Armour Ind. Chem. | Ethofat O/15. | Polyethoxylated fatty acid. | | | Kerosene | 180 | 300 | 80 |
| 18 | do | Ethomeen 18/60. | Polyethoxylated fatty amine. | | | do | 300 | 300 | 35 |
| 19 | General Aniline & Film. | Igepon TN-74. | Sodium-N-methyl-N-palmitoyl taurate. | | | do | 175 | 300 | 17 |
| 20 | do | Igepon TE-42 | Sodium-N-methyl-N-tallow acid taurate. | | | do | 180 | 300 | 12 |
| 21 | do | Gafac PE-150. | Free acid of complex organic phosphate ester. | | | do | 135 | 300 | 25 |
| 22 | do | Gafac RE-610. | do | | | do | 180 | 300 | 90 |
| 23 | do | Gafac LO-529. | Sodium salt of complex organic phosphate ester. | | | do | 50 | 300 | 20 |
| 24 | Armour Ind. Chem. | Ethomeen 18/60. | Polyethoxylated fatty amine. | Armour Ind. Chem. | Ethomeen S/12. | Polyethoxylated fatty amine. | 300 | 300 | 55 |

[1] HAO=Hydrophilic Agent only. [2] LAO=Lipophilic Agent only.

EXAMPLE 25

A method for fracturing a subterranean oil-bearing formation employing the aqueous low loss fluid compositions of this invention is illustrated in this example. A well is drilled through the formation and cased to a depth below the producing zone with 7-inch steel casing. The casing is perforated with four ⅜-inch perforations per foot between the interval of 6300 feet and 6308 feet. Tubing is run into the well to a depth of 6300 feet and a packer installed immediately above the terminus of the tubing.

The fracturing fluid is prepared by admixing 0.08 lb. of diesel oil, 0.25 lb. of sodium N-methyl-N-tallow acid taurate marketed by the General Aniline and Film Company under the trademark Igepon TE-42, and 2.5 pounds of wax-polymer particles per gallon of aqueous fracturing fluid. The wax-polymer particles are homogeneous solid solutions comprised of 90 percent paraffin wax melting between about 140 and 142° F. and 10 percent ethylene-vinyl acetate copolymer marketed by the E. I. Du Pont Chemical Company under the trademark Elvax. Approximately 50 percent of the wax-polymer particles are minus 150 mesh U.S. Standard Sieve in size, with the balance having a size within the range that will pass a number 8 and be retained on a number 150 U.S. Standard Sieve.

The fracturing fluid composition is injected through the tubing and into the formation at a volumetric flow rate and pressure sufficient to fracture the formation, fluid injection is continued to extend these fractures deep into the formation.

While particular embodiments of the invention have been described, it will be understood, of course that the invention is not limited thereto since many modifications can be made, and it is intended to include within the invention any such modifications as fall within the scope of the claims.

The invention having thus been described, we claim:

1. A method for reducing the loss of an aqueous liquid within a well bore to an adjacent permeable subterranean formation penetrated by the well, which comprises dispersing into said liquid an admixture of (1) 0.5 to 40 weight percent of oil-soluble, water-insoluble, homogeneous solid particles consisting essentially of petroleum wax and a polymer selected from the group consisting of (a) addition polymers of an olefin having between 2 and 4 carbon atoms, (b) copolymers of an olefin having between 2 and 4 carbon atoms and an alkyl acrylate containing not more than 4 carbon atoms in the alkyl group, (c) copolymers of an olefin having between 2 and 4 carbon atoms and an ester formed by the reaction of butenic acid and an alcohol having no more than 4 carbon atoms, and (d) copolymers of olefins having between 2 and 4 carbon atoms and an ester formed by the reaction of acetic acid and an unsaturated alcohol having no more than 4 carbon atoms; (2) from 0.05 to 25 weight percent of said solid particles of a hydrophilic agent and about 0.1 to 15 weight percent of said solid particles of a lipophilic agent, said hydrophilic agent and said lipophilic agent being respectively selected from the group consisting of (1) sodium N-methyl-N-palmitoyl taurate and a normally liquid petroleum distillate, (2) sodium N-methyl-N-tallow acid taurate and a normally liquid petroleum distillate, (3) sodium N-methyl-N-tallow acid taurate and sorbitan monooleate, (4) octylphenoxypolyethoxy ethanol having between 16 and 30 mole equivalents of ethylene oxide and sorbitan monolaurate, and (5) sodium lauryl sulfate and sorbitan monooleate, the weight ratio of said hydrophilic to said lipophilic agent in said dispersion being between about 1 and 4.

2. The method defined in claim 1 wherein said polymer is selected from the group consisting of polyethylene, polypropylene, copolymer ethylene and methyl methacrylate, copolymer ethylene and vinyl acetate, and copolymer ethylene and ethyl acrylate.

3. The method defined in claim 1 wherein said aqueous liquid is water, caustic, brine or acid.

4. In the method of fracturing a permeable subterranean formation penetrated by a well wherein a fluid is injected into said well and into contact with said formation at a pressure and volumetric flow rate sufficient to fracture said formation, the improvement comprising injecting into said well an aqueous dispersion having low fluid loss properties and comprising a dispersion of 0.5 to 40 weight percent of oil-soluble, water-insoluble, homogeneous solid particles consisting essentially of petroleum wax and a polymer selected from the group consisting of polyethylene, polypropylene, copolymer ethylene and methyl methacrylate, copolymer ethylene and vinyl acetate, and copolymer ethylene and ethyl acrylate in an aqueous liquid containing from 0.05 to 25 weight percent of said solid particles of a hydrophilic agent and from 0.1 to 15 weight percent of said solid particles of a lipophilic agent, said hydrophilic agent and said lipophilic agent being respectively selected from the group consisting of (1) sodium N-methyl-N-palmitoyl taurate and a normally liquid petroleum distillate, (2) sodium N-methyl-N-tallow acid taurate and a normally liquid petroleum distillate, (3) sodium N-methyl-N-tallow acid taurate and sorbitan monooleate; (4) octylphenoxypolyethoxy ethanol having between about 16 and 30 mole equivalents of ethylene oxide and sorbitan monolaurate, and (5) sodium lauryl sulfate and sorbitan monooleate, the weight ratio of said hydrophilic agent to said lipophilic agent being between about 1 and 4.

5. An aqueous low fluid loss composition comprising an admixture of:
about 0.5 to 40 weight percent of oil-soluble, water insoluble, homogeneous solid particles consisting essentially of petroleum wax and a polymer selected from the group consisting of (a) addition polymers of an olefin having between 2 and 4 carbon atoms, (b) copolymers of an olefin having between 2 and 4 carbon atoms and an alkyl acrylate containing not more than 4 carbon atoms in the alkyl group, (c) copolymers of an olefin having between 2 and 4 carbon atoms and an ester formed by the reaction of butenic acid and an alcohol having no more than 4 carbon atoms, and (d) copolymers of olefins having between 2 and 4 carbon atoms, and an ester formed by the reaction of acetic acid and an unsaturated alcohol having no more than 4 carbon atoms;
about 0.05 to 25 weight percent of said solid particles of a hydrophilic agent and 0.1 to 15 weight percent of said solid particles of a lipophilic agent being respectively selected from the group consisting of (1) sodium N-methyl-N-palmitoyl taurate and a normally liquid petroleum distillate, (2) sodium N-methyl-N-tallow acid taurate and a normally liquid petroleum distillate, (3) sodium N-methyl-N-tallow acid taurate and sorbitan monooleate, (4) octylphenoxypolyethoxy ethanol having between about 16 and 30 mole equivalents of ethylene oxide and sorbitan monolaurate, and (5) sodium lauryl sulfate and sorbitan monooleate, the weight ratio of said hydrophilic agent to said lipophilic agent being between 1 and 4; and
an aqueous liquid.

6. The composition defined in claim 5 wherein said polymer is selected from the group consisting of polyethylene, polypropylene, copolymer ethylene and methyl methacrylate, copolymer ethylene and vinyl acetate, and copolymer ethylene and ethyl acrylate.

7. The composition defined in claim 5 wherein said normally liquid petroleum distillate is gasoline, kerosene or diesel oil.

8. An aqueous low loss fluid composition comprising an admixture of (1) up to about 40 weight percent of oil-soluble, water-insoluble, homogeneous solid particles comprised of a solid solution of petroleum wax and a polymer selected from the group consisting of polyethylene, polypropylene, copolymer ethylene and methyl methacrylate, copolymer ethylene and vinyl acetate, and copolymer ethylene and ethyl acrylate; (2) 0.1 to 15 weight percent based on the weight of said solid particles of sodium N-methyl-N-palmitoyl taurate or sodium N-methyl-N-tallow acid taurate; (3) 0.05 to 25 weight percent based on the weight of said solid particles of a normally liquid petroleum distillate; and (4) water, brine or acid.

References Cited
UNITED STATES PATENTS

| | | | |
|---|---|---|---|
| 3,479,287 | 11/1969 | Floyd et al. | 252—8.5 |
| 2,684,948 | 7/1954 | Cross | 252—311.5 |
| 2,779,735 | 1/1957 | Brown et al. | 252—8.55 |
| 3,373,106 | 3/1968 | Lister et al. | 252—8.5 |
| 3,455,390 | 7/1969 | Gallus | 252—8.55 |

OTHER REFERENCES

Rogers: Composition and Properties of Oil Well Drilling Fluids, 2nd edition, Pub. 1953 by Gulf Pub. Co. of Houston, Tex., pp. 497–504, 507, 508.

HERBERT B. GUYNN, Primary Examiner

U.S. Cl. X.R.

166—282, 283; 252—8.5 C, 8.5 P, 8.55 C, 311.5